(12) United States Patent
Tripathy et al.

(10) Patent No.: US 11,919,078 B2
(45) Date of Patent: Mar. 5, 2024

(54) METHODS OF FORMING NEAR-NET SHAPE STRUCTURES FROM NON-STOICHIOMETRIC OXIDES

(71) Applicant: Battelle Energy Alliance, LLC, Idaho Falls, ID (US)

(72) Inventors: Prabhat K. Tripathy, Idaho Falls, ID (US); Michael R. Shaltry, Idaho Falls, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 367 days.

(21) Appl. No.: 16/841,863

(22) Filed: Apr. 7, 2020

(65) Prior Publication Data

US 2020/0324336 A1 Oct. 15, 2020

Related U.S. Application Data

(60) Provisional application No. 62/832,590, filed on Apr. 11, 2019.

(51) Int. Cl.
*B22F 3/00* (2021.01)
*C25D 1/00* (2006.01)
*B22F 3/24* (2006.01)

(52) U.S. Cl.
CPC .............. *B22F 3/001* (2013.01); *B22F 3/24* (2013.01); *C25D 1/003* (2013.01)

(58) Field of Classification Search
CPC . B22F 3/001; B22F 3/24; C25D 1/003; C25D 11/00; C25D 5/00; B01J 37/082; B01J 37/16; B01J 37/088; B01J 23/00; C25F 1/16; C04B 2235/652; C22B 34/129
See application file for complete search history.

(56) References Cited

U.S. PATENT DOCUMENTS

| | | | | |
|---|---|---|---|---|
| 4,571,315 A | * | 2/1986 | Gerontopoulos | ......... B01J 2/08 501/12 |
| 6,713,176 B2 | * | 3/2004 | Yadav | ................. H01M 4/8875 423/276 |
| 9,340,902 B2 | * | 5/2016 | Kim | ..................... C30B 11/003 |
| 2005/0166706 A1 | * | 8/2005 | Withers | ............... C22B 34/129 205/560 |
| 2022/0145484 A1 | * | 5/2022 | Wang | ..................... C25C 7/025 |

* cited by examiner

*Primary Examiner* — Ricardo D Morales
(74) *Attorney, Agent, or Firm* — TraskBritt (57) ABSTRACT

A method of forming a near-net shape structure comprises forming a structure comprising non-stoichiometric metal oxide comprising at least one metal and less than a stoichiometric amount of oxygen, and electrochemically reducing the non-stoichiometric metal oxide in an electrochemical cell to form a structure having a near-net shape and comprising the at least one metal having less than about 1,500 ppm oxygen. Related methods of forming a non-stoichiometric metal oxide by sintering, annealing, or additive manufacturing, and forming a near-net shape structure from the non-stoichiometric metal oxide, as well as related electrochemical cells are also disclosed.

23 Claims, 8 Drawing Sheets

METHODS OF FORMING NEAR-NET SHAPE STRUCTURES FROM NON-STOICHIOMETRIC OXIDES

CROSS-REFERENCE TO RELATED APPLICATION

This application claims the benefit of U.S. Provisional Patent Application Ser. No. 62/832,590, filed Apr. 11, 2019, and entitled "FABRICATION OF NEAR-NET SHAPE METALLIC COMPONENTS FROM OXIDES," the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to methods of forming a near-net shape structure comprising a metal from a metal oxide. More particularly, embodiments of the disclosure relate to methods of forming a near-net shape structure comprising a metal from a precursor structure comprising a non-stoichiometric metal oxide, and to related structures.

BACKGROUND

Fabrication of near-net shape structures is often desired in the manufacturing of various articles, components, and devices. Various manufacturing industries spend considerable resources to form structures having a desired size and shape. As one example, a structure comprising a metal may be formed by chemically reducing a material composition including the metal, consolidating the metal (e.g., producing a powder comprising the metal, disposing the powder in a die or mold, compacting the metal powder, sintering the metal powder, etc.), and fabricating a component or structure from the consolidated metal.

As another example, fabrication of a structure having a desired size and shape may include casting or forging a material, machining the material to a desired size and shape, followed by grinding and/or polishing the material to form a structure having a desired size and shape. However, the fabrication of near-net shape structures using such methods may be time consuming and costly, particularly when it is desired to form a plurality of structures having the near-net shape.

Other methods of forming a structure having a desired size and shape include formation of an oxide precursor by a slip cast process, followed by reducing the oxide precursor to a metal. However, the resulting structure varies in size and shape relative to the original oxide precursor. In addition, such methods are only suited for the formation of hollow structures and do not facilitate formation of solid articles.

BRIEF SUMMARY

In accordance with one embodiment described herein, a method of forming a near-net shape structure comprises forming a structure comprising non-stoichiometric metal oxide comprising at least one metal and less than a stoichiometric amount of oxygen, and electrochemically reducing the non-stoichiometric metal oxide in an electrochemical cell to form a structure having the near-net shape and comprising the at least one metal having less than about 1,500 ppm oxygen.

In additional embodiments, a method of forming a near-net shape structure comprises forming a green structure comprising at least one metal oxide, sintering the green structure in the presence of at least one reducing gas to reduce the at least one metal oxide of the green structure to a non-stoichiometric metal oxide, and reducing the non-stoichiometric metal oxide in an electrochemical cell to form the near-net shape comprising an elemental metal or a metal alloy.

In further embodiments, a method of forming a near-net shape structure comprises forming a structure comprising an oxygen deficient non-stoichiometric metal oxide in a reducing environment, the non-stoichiometric metal oxide comprising less than a stoichiometric amount of oxygen and at least one metal, and electrochemically reducing the non-stoichiometric metal oxide in an electrochemical cell to form the near-net shape structure.

In yet further embodiments, an electrochemical cell comprises a molten salt comprising one or more of sodium chloride, calcium chloride, calcium bromide, sodium bromide, and magnesium bromide, a cathode disposed in the molten salt and coupled to a non-stoichiometric metal oxide comprising at least one oxygen deficient one metal oxide, and an anode disposed in the molten salt.

DETAILED DESCRIPTION

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a non-stoichiometric metal oxide or a near-net shape structure from the non-stoichiometric metal oxide. Only those process acts and structures necessary to understand the embodiments of the disclosure are described in detail below. Additional acts to form the near-net shape structure including the materials and methods described herein may be performed by conventional techniques. Also note, any drawings accompanying the present application are for illustrative purposes only, and are thus not drawn to scale. Additionally, elements common between figures may retain the same numerical designation.

As used herein, the terms "comprising," "including," "having," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features, and methods usable in combination therewith should or must be excluded.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "non-stoichiometric" means and includes a chemical compound (e.g., a metal oxide) with an elemental composition that cannot be represented by a ratio of well-defined natural numbers and is in violation of the law of definite proportions. In some embodiments, a non-stoichiometric metal oxide includes a metal oxide that has less than a stoichiometric amount of oxygen. In some such embodiments, a non-stoichiometric metal oxide comprises an oxygen deficient (e.g., oxygen poor) metal oxide.

As used herein, the term "green structure" means and includes a structure that is formed from compaction and pressing of a powder (e.g., a metal oxide powder or a mixture of metal oxide powders).

According to methods described herein, a method of forming a near-net shape structure comprising a metal includes forming a metal oxide precursor, exposing the metal oxide precursor to a reducing environment to form a non-stoichiometric metal oxide, and electrochemically reducing the non-stoichiometric metal oxide precursor to form a structure including the metal having a near-net shape. The metal oxide precursor may include an oxide of the metal of the near-net shape structure. The metal oxide precursor may include a powder and may be mixed with one or more of binders, sintering aids, and additives. The powder including the metal oxide precursor may be placed into a mold and exposed to a suitable pressure (e.g., in a hydraulic press) to form a so-called "green body" or "green-structure" comprising the metal oxide precursor. The green body may be sintered in a reducing atmosphere to form a sintered structure comprising a non-stoichiometric metal oxide. The reducing atmosphere may be formed of, for example, one or more reducing agents, such as one or more of hydrogen ($H_2$) gas, helium, and argon. In other embodiments, a non-stoichiometric metal oxide may be formed by spray coating or thermal spraying a substrate with a powder including a metal oxide to form a structure comprising the metal oxide on the substrate, followed by annealing the structure in a reducing atmosphere. In yet other embodiments, the non-stoichiometric metal oxide may be formed by additive manufacturing in a reducing atmosphere. A powder including one or more metal oxides may be formed on a substrate layer by layer and in the presence of a reducing atmosphere (e.g., hydrogen) to form a non-stoichiometric metal oxide on the substrate. In some such embodiments, the non-stoichiometric metal oxide is formed layer by layer to form a structure having a desired initial size and shape.

The non-stoichiometric metal oxide may be chemically reduced in an electrochemical cell (e.g., electrochemical bath) to form a substantially pure metal (substantially free of oxygen) having a desired size and shape. Forming the metal from the non-stoichiometric metal oxide in the electrochemical cell may facilitate formation of a substantially pure metal at a faster kinetic rate compared to conventional electrochemical reduction processes. It is believed that the non-stoichiometry of the metal oxide facilitates improved transfer of oxygen ions through a matrix of the non-stoichiometric metal oxide during the electrochemical reduction process and increased removal of oxygen from the metal oxide compared to conventional electrochemical reduction of stoichiometric metal oxides. The size and shape of the final structure comprising the metal may be based on the size and shape of the metal oxide precursor structure. The structure may be formed of a substantially non-oxidized metal or metal-alloy and may exhibit less than about 2,000 ppm oxygen, such as less than about 1,500 ppm oxygen, or even less than about 1,200 ppm. Accordingly, the structure may include less oxygen compared to structures formed by electrochemically reducing stoichiometric metal oxides.

Figure 1A:
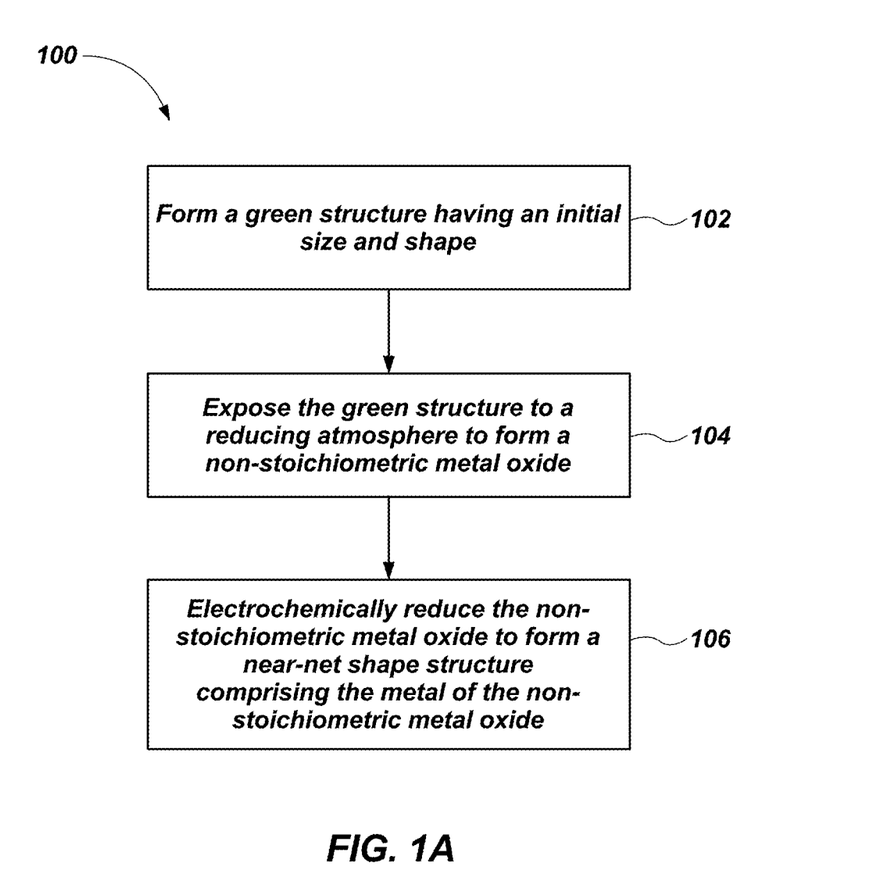
FIG. 1A is a simplified flow diagram illustrating a method of forming a near-net shape structure, in accordance with embodiments of the disclosure.

FIG. 1A is a simplified flow diagram illustrating a method 100 of forming a near-net shape structure, in accordance with embodiments of the disclosure. The method 100 includes act 102 including forming a green structure having an initial size and shape; act 104 exposing the green structure to a reducing atmosphere to form a non-stoichiometric metal oxide; and act 106 including electrochemically reducing the non-stoichiometric metal oxide to form a near-net shape structure comprising the metal of the non-stoichiometric metal oxide.

Act 102 may include forming a green structure having an initial size and shape. The initial size and shape of the green structure may be determined based on the desired size and shape of the near-net shape structure comprising the metal. In some embodiments, the initial size and shape of the green structure may be larger than the desired near-net shape. Stated another way, during the method 100 (e.g., during acts 104 and 106), the size of the green structure may be reduced to the near-net shape.

The green structure may be formed from a powder mixture comprising at least one metal oxide. The metal oxide may have a chemical formula of $M_xO_y$, wherein M represents a metal and x and y are integers. In some embodiments, x and y represent a stoichiometric amount of the respective metal and oxygen. In some embodiments, the powder mixture consists essentially of the at least one metal oxide. The at least one metal oxide may include one or more of at least one transition metal oxide (e.g., an oxide of one or more of scandium, titanium, vanadium, chromium, manganese, iron, cobalt, nickel, copper, zinc, zirconium, niobium, molybdenum, cadmium, hafnium, tantalum, tungsten, rhenium) and at least one rare earth metal oxide (e.g., an oxide of one or more of lanthanum, praseodymium, neodymium, samarium, terbium, dysprosium). By way of non-limiting example, the powder mixture may comprise one or more of titanium oxide (e.g., titanium dioxide; $TiO_2$), tantalum oxide ($Ta_2O_5$), iron oxide ($Fe_2O_3$ (ferric oxide), $Fe_3O_4$, ferrous oxide (FeO)), cobalt oxide (CoO, $Co_2O_3$, $Co_3O_4$), nickel oxide (NiO, $Ni_2O_3$), manganese oxide (MnO, $MnO_2$), chromium oxide (CrO, $CrO_2$, $CrO_3$, $CrO_5$, $Cr_2O_3$), rare earth oxides (e.g., lanthanum oxide ($La_2O_3$), dysprosium oxide ($Dy_2O_3$), samarium oxide ($Sm_2O_3$), terbium oxide ($Tb_2O_3$, $Tb_4O_7$), neodymium oxide ($Nd_2O_3$), praseodymium oxide ($Pr_6O_{11}$)), scandium oxide ($Sc_2O_3$), vanadium oxide (VO, $V_2O_3$, $VO_2$, $V_2O_5$), zinc oxide (ZnO), zirconium oxide ($ZrO_2$), niobium oxide (NbO, $NbO_2$, $Nb_2O_5$), molybdenum oxide ($MoO_2$, $MoO_3$), hafnium oxide ($HfO_2$), tungsten oxide ($W_2O_3$, $WO_2$, $WO_3$), steel (e.g., 316 stainless steel), or other metal oxides.

In some embodiments, the at least one metal oxide comprises a mixture of two or more metal oxides, which may facilitate formation of a near net shape structure comprising two or more metals (e.g., an alloy of the two or more metals). In some embodiments, the at least one metal oxide comprises a mixture of cobalt oxide and one or more of samarium oxide, iron oxide, and nickel oxide. In some embodiments, the at least one metal oxide comprises cobalt oxide and samarium oxide. In other embodiments, the at least one metal oxide comprises cobalt oxide and iron oxide. In yet other embodiments, the at least one metal oxide comprises cobalt oxide and nickel oxide. In further embodiments, the at least one metal oxide comprises cobalt oxide, nickel oxide, and iron oxide.

In some embodiments, the at least one metal oxide comprises metal oxides of metals that form steel. For example, the at least one metal oxide may include a mixture of iron oxide and chromium oxide. In other embodiments, the at least one metal oxide includes a mixture comprising from about 16 weight percent to about 18 weight percent chromium, from about 10 weight percent to about 12 weight percent nickel, from about 2 weight percent to about 3 weight percent molybdenum, up to about 2 weight percent manganese, up to about 0.75 weight percent silicon, up to about 0.045 weight percent phosphorus, up to about 0.03 weight percent sulfur, up to about 0.08 weight percent carbon, up to about 0.10 weight percent nitrogen, the remainder comprising iron, wherein the above-referenced weight percentages ignore oxygen. In some such embodiments, the mixture may comprise iron oxide, chromium oxide, nickel oxide, molybdenum oxide, manganese oxide, silicon dioxide, phosphorus, sulfur, and carbon. In some such embodiments, the mixture may be used to form a final structure comprising stainless steel, such as 316 stainless steel or 316L stainless steel.

In some embodiments, the at least one metal oxide comprises at least one rare earth metal oxide, such as a mixture of neodymium oxide and praseodymium oxide, or a mixture of dysprosium oxide and neodymium oxide. In some embodiments, the at least one metal oxide comprises a mixture of at least one rare earth metal oxide and at least one transition metal oxide, such as, for example, a mixture of lanthanum oxide and titanium dioxide, a mixture of dysprosium oxide and iron oxide, a mixture of terbium oxide and iron oxide, a mixture of dysprosium oxide and nickel oxide, or a mixture of neodymium oxide and nickel oxide.

The at least one metal oxide may include a mixture comprising at least two transition metal oxides, such as a mixture of nickel oxide and titanium dioxide, a mixture of chromium oxide and nickel oxide, or a mixture of manganese oxide and chromium oxide.

In some embodiments, the at least one metal oxide may comprise a mixture formulated and configured to exhibit magnetic properties after reduction thereof. For example, the at least one metal oxide may comprise a mixture of iron oxide and cobalt oxide, a mixture of iron oxide and nickel oxide, a mixture of nickel oxide and cobalt oxide, a mixture of nickel oxide, cobalt oxide, and iron oxide, or a mixture of neodymium oxide and iron oxide.

In some embodiments, the powder mixture may further include at least one dopant that may be present in the final structure. By way of non-limiting example, the at least one dopant may comprise one or more of boron, carbon, phosphorus, silicon, aluminum, and another material. In some embodiments, the dopant comprises boron. The dopant may be present in the powder mixture as an oxide. In other embodiments, the dopant is present in the powder mixture in elemental form.

Particles of the powder mixture may have a diameter within a range from about 10 μm to about 100 μm. A shape of the particles of the powder may be one or more of spherical, flake, rod, or other shapes. In some embodiments, the particles have a substantially spherical shape.

In some embodiments, forming the green structure may include blending the powder mixture with at least one additive (e.g., at least one binder, at least one resin material). The at least one additive may include, for example, a high molecular weight material, such as a lubricant wax, carbon, a high molecular weight poly(ethylene oxide), polyethylene glycol, polyvinyl alcohol, a coal tar pitch (CTP) material, other binder materials, or combinations thereof.

The blended powder mixture may be compacted into a suitable geometry having a desired size and shape to form the green structure. For example, the powder mixture may be placed in a die or mold having a desired size and shape and the die or mold may be subjected to a suitable pressure (e.g., with a hydraulic press) to form the green structure. By way of non-limiting example, the powder mixture may be exposed to a pressure within a range from about 0.5 MPa to about 100 MPa, such as from about 0.5 MPa to about 1.0 MPa, from about 1.0 MPa to about 10 MPa, from about 10 MPa to about 50 MPa, or from about 50 MPa to about 100 MPa. Of course, the disclosure is not so limited and other pressures may be used for forming the green structure.

With continued reference to FIG. 1A, the method 100 further includes act 104 including exposing the green structure to a reducing atmosphere to convert the metal oxide of the green structure to a non-stoichiometric metal oxide. In some embodiments, exposing the green structure to the reducing atmosphere comprises sintering or annealing the green body in a reducing environment to form the non-stoichiometric metal oxide. Sintering or annealing the green body in the reducing atmosphere may chemically reduce at least a portion of the green structure and form a non-stoichiometric (e.g., partially reduced) metal oxide comprising an oxygen deficient (oxygen poor) metal oxide. In some embodiments, placing the green structure in the reducing atmosphere only partially reduces the green structure. Accordingly, after exposure of the green structure to the reducing environment, the non-stoichiometric metal oxide may include fewer oxygen atoms than the green structure. The non-stoichiometric metal oxide may have a chemical formula of $M_xO_{(y-z)}$, wherein M represents a metal (e.g., a metal of one of the metal oxides described above with reference to the powder mixture), x represents a stoichiometric amount of the metal, y represents a stoichiometric amount of oxygen for the particular metal, and z is a number greater than 0 and less than about 20% of y.

The reducing environment may include one or more reducing gases. The one or more reducing gases may be formulated to reduce the metal oxide of the green structure without substantially contaminating the green structure. By way of non-limiting example, the reducing gas may include hydrogen ($H_2$) (e.g., pure hydrogen), a mixture of hydrogen and at least one other gas, such as a mixture of hydrogen and argon, a mixture of hydrogen and helium, or a mixture of hydrogen, argon, and helium. In some embodiments, the reducing gas comprises substantially pure hydrogen. In other embodiments, the reducing gas comprises from about 2.0 volume percent to about 5.0 volume percent (e.g., about 2.97 volume percent) hydrogen, the remainder comprising argon.

Figure 1B:
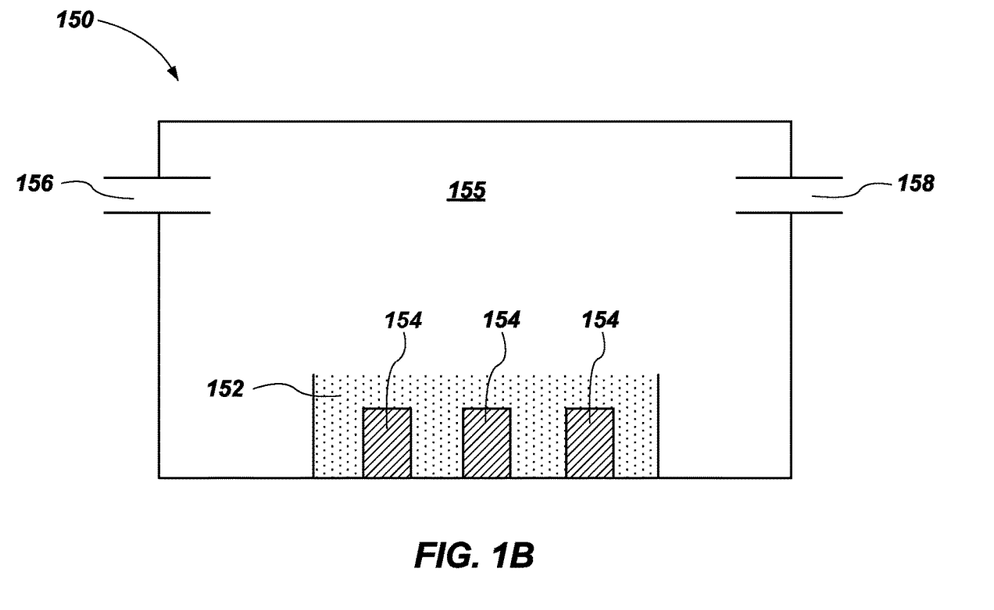
FIG. 1B is a simplified schematic of a reactor for forming a non-stoichiometric metal oxide, in accordance with embodiments of the disclosure.

In some embodiments, the green structure is placed in a crucible (e.g., an alumina boat) and the crucible is placed in the reducing environment. In some embodiments, the alumina boat is placed in a reactor, such as a continuous flow reactor (e.g., a horizontal reactor). FIG. 1B is a simplified schematic of a reactor 150 for forming the non-stoichiometric metal oxide, in accordance with embodiments of the disclosure. The reactor 150 may include a crucible 152 in which one or more green structures 154 comprising the stoichiometric metal oxide are disposed. The reactor 150 may include an inlet 156 and an outlet 158. The inlet 156 and outlet 158 may be configured to facilitate a substantially constant flow of a reducing gas through a volume 155 between the inlet 156 and the outlet 158 to maintain a reducing atmosphere proximate the one or more green structures 154.

In some embodiments, the flowrate of the reducing gas between the inlet 156 and the outlet 158 may depend on, among other things, the composition of the reducing gas (e.g., the volume percent of hydrogen in the reducing gas), the temperature of the reactor 150, and the composition of the green structure 154.

The reactor 150 may be coupled to a heat source configured to maintain a temperature (e.g., an elevated temperature) of the reactor 150 at a desired temperature. In use and operation, the temperature of the reactor 150 may be within a range from about 800° C. to about 1,500° C., such as from about 800° C. to about 900° C., from about 900° C. to about 1,000° C., from about 1,000° C. to about 1,100° C., from about 1,100° C. to about 1,200° C., from about 1,200° C. to about 1,300° C., from about 1,300° C. to about 1,400° C., or from about 1,400° C. to about 1,500° C. The temperature of the reactor 150 may depend on the composition of the green structure. For example, where the green structure comprises titanium dioxide, the temperature of the reactor 150 may be about 1,000° C. Where the green structure comprises neodymium oxide, the temperature of the reactor 150 may be within a range from about 1,150° C. to about 1,200° C. As another example, where the green structure comprises tantalum oxide, the temperature may be about 950° C.

The green structure may be exposed to the elevated temperature in the reducing atmosphere for a duration from about 1 hour to about 5 hours, such as from about 1 hour to about 3 hours, or from about 3 hours to about 5 hours.

Exposing the green structure 154 to the elevated temperature in the reducing atmosphere may at least partially reduce the metal oxide of the green structure 154 and form the non-stoichiometric metal oxide. In some embodiments, the non-stoichiometric metal oxide is oxygen deficient. In other words, the non-stoichiometric metal oxide may include less than a stoichiometric amount of oxygen.

In some embodiments, the non-stoichiometric metal oxide may be from about 1 percent to about 20 percent oxygen deficient, such as from about 1 percent to about 3 percent, from about 3 percent to about 5 percent, from about 5 percent to about 10 percent, from about 10 percent to about 15 percent, or from about 15 percent to about 20 percent oxygen deficient. Stated another way, the non-stoichiometric metal oxide may have from about 1 percent to about 20 percent less oxygen atoms than a stoichiometric amount of oxygen for the particular metal oxide. However, the disclosure is not so limited and the non-stoichiometric metal oxide may be more oxygen deficient than described above.

In some embodiments, the removal of oxygen from the green structure and formation of the non-stoichiometric oxide in the green structure 154 may form defects in the oxide matrix of the non-stoichiometric metal oxide. As will be described herein, it is believed that the defects in the oxide matrix facilitate improved kinetics for reduction of the non-stoichiometric oxide into a substantially reduced metal during later processing acts. However, the final structure formed by the methods according to embodiments of the disclosure may be substantially defect-free.

Figure 1C:
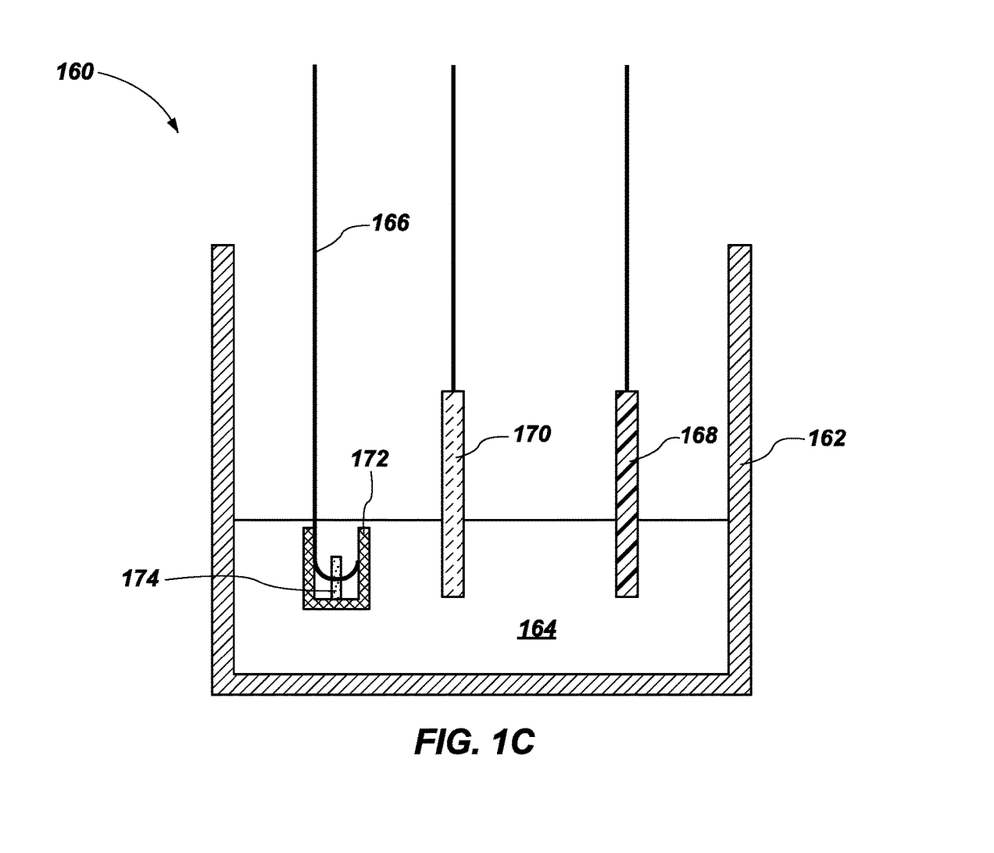
FIG. 1C is a simplified schematic illustrating an electrochemical cell configured for electrochemically reducing a non-stoichiometric metal oxide, in accordance with embodiments of the disclosure.

Referring back to FIG. 1A, the method 100 further comprises act 106 including electrochemically reducing the non-stoichiometric metal oxide to form a near-net shape structure comprising the metal of the non-stoichiometric metal oxide. FIG. 1C is a simplified schematic illustrating an electrochemical cell 160 configured for electrochemically reducing the non-stoichiometric metal oxide, in accordance with embodiments of the disclosure.

The electrochemical cell 160 includes a crucible 162 configured to hold an electrolyte 164. The crucible 162 may be formed of and include a ceramic material (e.g., alumina, magnesia (MgO), boron nitride (BN)), graphite, or a metallic material (e.g., nickel, stainless steel, molybdenum, or an alloy of nickel including chromium and iron), such as Inconel®, commercially available from Special Metals Corporation of New Hartford, New York.

The electrolyte 164 may be disposed within the crucible 162. The electrolyte 164 may comprise, for example, a molten salt. By way of non-limiting example, the electrolyte 164 may be formed of and include a chloride molten salt (e.g., molten sodium chloride (NaCl), molten calcium chloride ($CaCl_2$)), a molten mixture of sodium chloride and calcium chloride), a bromide molten salt (e.g., molten calcium bromide ($CaBr_2$), molten sodium bromide (NaBr), molten magnesium bromide ($MgBr_2$), a molten mixture of sodium bromide and calcium bromide), or a mixed molten salt (e.g., a mixture of at least one molten chloride salt and at least one molten bromide salt).

The electrolyte 164 may be formulated and configured to exhibit a melting temperature within a range of from about 550° C. to about 950° C., such as from about 550° C. to about 650° C., from about 650° C. to about 750° C., from about 750° C. to about 850° C., or from about 850° C. to about 950° C.

The electrochemical cell 160 may further include a working electrode (also referred to as a cathode) 166, a counter electrode (also referred to as an anode) 168, and a reference electrode 170, each of which is at least partially disposed in the molten salt 164.

The counter electrode 168 may be formed of and include one or more of graphite (e.g., high density graphite), a platinum group metal (e.g., platinum, osmium, iridium, ruthenium, rhodium, and palladium), an oxygen evolving electrode, or another material. In some embodiments, the counter electrode 168 comprises graphite. In other embodiments, the counter electrode 168 comprises one or more platinum group metals. In some embodiments, the counter electrode 168 comprises one or more platinum group metals (e.g., ruthenium, rhodium, palladium, osmium, iridium, and platinum), and one or more transition metals.

The reference electrode 170 may comprise any suitable materials. In some embodiments, the reference electrode 170 comprises glassy carbon.

The current collector of the working electrode 166 may comprise, for example, nickel. However, the disclosure is not so limited and the current collector working electrode 166 may include other materials. In some embodiments, the current collector working electrode 166 comprises a wire. The current collector of the working electrode 166 may be coupled to a basket 172 configured to retain one or more non-stoichiometric metal oxides 174 (e.g., one or more of the partially reduced non-stoichiometric metal oxides formed during act 104). In some embodiments, the basket 172 comprises a wire basket and comprises the same material composition as the current collector of the working electrode 166.

The non-stoichiometric metal oxide 174 may be coupled to (e.g., directly contact) at least one of the current collector of the working electrode 166 and the basket 172. In some embodiments, the non-stoichiometric metal oxide 174 includes a portion sized and shaped to receive a portion of the current collector of the working electrode 166. By way of non-limiting example, a portion of the current collector of the working electrode 166 may be fed through a portion of the non-stoichiometric metal oxide 174. As one example, the non-stoichiometric metal oxide 174 may include an aperture configured to receive the portion of the current collector of the working electrode 166.

In use and operation, a voltage may be applied between the working electrode 166 and the counter electrode 168 to facilitate reduction of the non-stoichiometric metal oxide 174. The voltage between the working electrode 166 and the counter electrode 168 may be within a range of from about 2.5 V to about 3.1 V, such as from about 2.5 V to about 2.7 V, from about 2.7 V to about 2.9 V, or from about 2.9 V to about 3.1 V. However, the disclosure is not so limited and the applied voltage may be different than that described above. In some embodiments, a voltage between the working electrode 166 and the reference electrode 170 is within a range from about 1.8 V to about 1.9 V.

In some embodiments, the voltage applied between the working electrode 166 and the counter electrode 168 may be substantially constant. In other embodiments, a current between the working electrode 166 and the counter electrode 168 may be maintained as a substantially constant current.

Responsive to exposure to the applied voltage in the electrochemical cell 160, the non-stoichiometric metal oxide 174 may be reduced to a substantially pure metal comprising the metal of the non-stoichiometric metal oxide. The metal atoms of the non-stoichiometric metal oxide 174 may be reduced at the working electrode 166 to generate a substantially non-oxidized metal (e.g., exhibiting less than about 2,000 ppm oxygen, such as less than about 1,500 ppm oxygen). For example, the reaction (1) below may occur at the working electrode 166:

$$MO_x + 2xe^- \rightarrow M + xO^{2-}; \quad (1),$$

wherein M is the metal of the non-stoichiometric metal oxide and x is the amount of oxygen present in the non-stoichiometric metal oxide.

Accordingly, oxygen atoms from the non-stoichiometric metal oxide 174 may be transported through the matrix of the non-stoichiometric metal oxide 174 and dissolved into the electrolyte 164 at the working electrode 166. The oxide ions may evolve at the counter electrode 168 according to the reaction 2 below:

$$2O^{2-} \rightarrow O_2 + 4e^-; \quad (2).$$

The non-stoichiometric metal oxide 174 may be exposed to the reducing conditions in the electrochemical cell 160 for a duration within a range from about 1 hour to about 48 hours, such as from about 1 hour to about 6 hours, from about 6 hours to about 12 hours, from about 12 hours to about 18 hours, from about 18 hours to about 24 hours, from about 24 hours to about 36 hours, or from about 36 hours to about 48 hours.

After a sufficient duration, the non-stoichiometric metal oxide 174 may be chemically reduced in the electrochemical cell 160 to form a near-net shape structure comprising a reduced metal comprising the metal of the metal oxide powder and substantially free of oxygen. In some embodiments, the near-net shape structure is substantially free of oxygen. For example, the reduced metal may comprise less than about 3,000 ppm oxygen, such as less than about 2,500 ppm oxygen, less than about 2,000 ppm oxygen, less than about 1,500 ppm oxygen, less than about 1,200 ppm oxygen, or even less than about 1,000 ppm oxygen.

The near-net shape structure may have a shape substantially corresponding to the shape of the green structure and the non-stoichiometric metal oxide. In some embodiments, a size of the near-net shape structure may be smaller (e.g., about 10 percent smaller, about 20 percent smaller, about 25 percent smaller) than the size of the non-stoichiometric metal oxide. Accordingly, the size of the green structure and/or the non-stoichiometric metal oxide may be selected based on the desired size of the near-net shape structure. In some embodiments, the diameter and thickness of a cylindrical near-net shaped structure may be reduced by about 26 percent and about 30 percent, respectively, with respect to the diameter and thickness of the green structure.

With reference again to FIG. 1A, act 106 may include exposing the near-net shape structure to water to clean surfaces of the near-net shape structure. In some embodiments, the near-net shape structure is exposed to an ultrasonic bath.

In some embodiments, the near-net shape structure may be exposed to a heat treatment, such as annealing. By way of non-limiting example, the near-net shape structure may be exposed to a temperature of about 100° C. for a duration of up to about 5 hours.

The reduced metal of the final structure may comprise an elemental metal or a metal alloy free (e.g., substantially free) of oxygen. In some embodiments, the final structure comprises at least one dopant (e.g., one or more of boron, carbon, phosphorus, silicon, aluminum). The composition of the final structure may depend on the composition of the powder mixture described above with reference to act 102.

In some embodiments, the final structure comprises a metal (e.g., titanium, tantalum, neodymium, iron, cobalt, nickel, samarium, chromium, lanthanum, dysprosium, terbium, praseodymium, manganese, scandium, vanadium, zinc, yttrium, zirconium, niobium, molybdenum, hafnium, or tungsten). In some embodiments, the metal comprises an elemental transition metal. In yet other embodiments, the metal comprises a rare earth metal.

In some embodiments, the final structure comprises an alloy comprising two or more metals. In some such embodiments, the final structure comprises cobalt and one or more of samarium (e.g., CoSm), iron (e.g., CoFe, CoFeNi, NdFe), and nickel (e.g., CoNi). In other embodiments, the final structure comprises steel, such as 316 stainless steel of 316L stainless steel. In some embodiments, the final structure comprises at least two transition metals, such as, for example, an alloy comprising nickel and titanium, an alloy comprising chromium and nickel, or an alloy comprising manganese and chromium.

In some embodiments, the final structure comprises at least one rare earth metal and at least one transition metal (e.g., one or more of scandium, titanium, vanadium, chromium, manganese, iron, cobalt, nickel, copper, zinc, yttrium, zirconium, niobium, molybdenum, lanthanum, hafnium, tantalum, tungsten, and rhenium). By way of non-limiting example, the final structure may comprise lanthanum and titanium, dysprosium and iron, terbium and iron, dysprosium and nickel, or neodymium and iron. In other embodiments, the final structure comprises an alloy of two or more rare earth metals, such as an alloy of neodymium and praseodymium, or an alloy of dysprosium and praseodymium.

In some embodiments, the final structure comprises a material exhibiting magnetic properties. In some embodiments, the final structure comprises a soft magnet. In some embodiments, the final structure comprises a rare earth magnetic material. By way of non-limiting example, the final structure may include an alloy of neodymium and iron, an alloy of iron and cobalt, an alloy of iron and nickel, an alloy of nickel and cobalt, or an alloy of nickel, cobalt, and iron.

Accordingly, in some embodiments, a method of forming a final structure comprising a substantially oxygen free metal or metal alloy having a desired near-net shape comprises electrochemically reducing a non-stoichiometric metal oxide in an electrochemical cell. The non-stoichiometric metal oxide may be formed by, for example, forming a green structure comprising one or more metal oxides comprising the metal of the final structure to be formed, and exposing the green structure to sintering conditions in the presence of a reducing gas for a predetermined duration. Without being bound by any particular theory, it is believed that performing the sintering process in the presence of the reducing gas partially reduces the metal oxide to create the non-stoichiometric metal oxide having defects in the oxide matrix. It is believed that the defects in the oxide matrix of the non-stoichiometric metal oxide facilitate improved diffusion of oxide ions through the oxide matrix during exposure of the metal oxide to reducing conditions in the electrochemical cell, thereby facilitating an improved kinetic rate of the electrochemical reduction and a reduced oxygen contact of the near-net shape structure. The resulting final structure exhibits improved properties (e.g., lower oxygen) compared to metals formed by slip casting of stable oxides in air and their subsequent electrochemical reduction. In addition, the final structure may exhibit many desired shapes, whereas structures formed by slip casting may be limited to particular shapes (e.g., hollow structures or powders).

Although FIG. 1A through FIG. 1C have a are described and illustrated as forming the non-stoichiometric metal oxide by sintering, the disclosure is not so limited. In some embodiments, a metal oxide is formed by spray coating, thermal spraying (e.g., cold spraying, high velocity oxygen fuel spraying (HVOC), vacuum plasma spraying (VPS)) or laser jet printing the metal oxide onto a substrate (e.g., sapphire (a material comprising $Al_2O_3$ and a trace amount of other elements such as iron, titanium, chromium, vanadium, and/or magnesium)). The metal oxide may include any of the metal oxides described above with reference to FIG. 1A. The substrate and the metal oxide may be annealed in a reducing atmosphere to form a non-stoichiometric metal oxide, which may be substantially the same as the non-stoichiometric metal oxides described above with reference to FIG. 1A through FIG. 1C. For example, the metal oxide may be exposed to a reducing atmosphere and a temperature within a range of from about 800° C. to about 1,5500° C., such as from about 800° C. to about 900° C., from about 900° C. to about 1,100"C, from about 1,100° C. to about 1,300° C., or from about 1,300° C. to about 1,500° C. to form the non-stoichiometric metal oxide. The non-stoichiometric metal oxide may be reduced in an electrochemical cell to form a near-net shape structure, as described above with reference to act 106 of FIG. 1A.

Figure 2A:
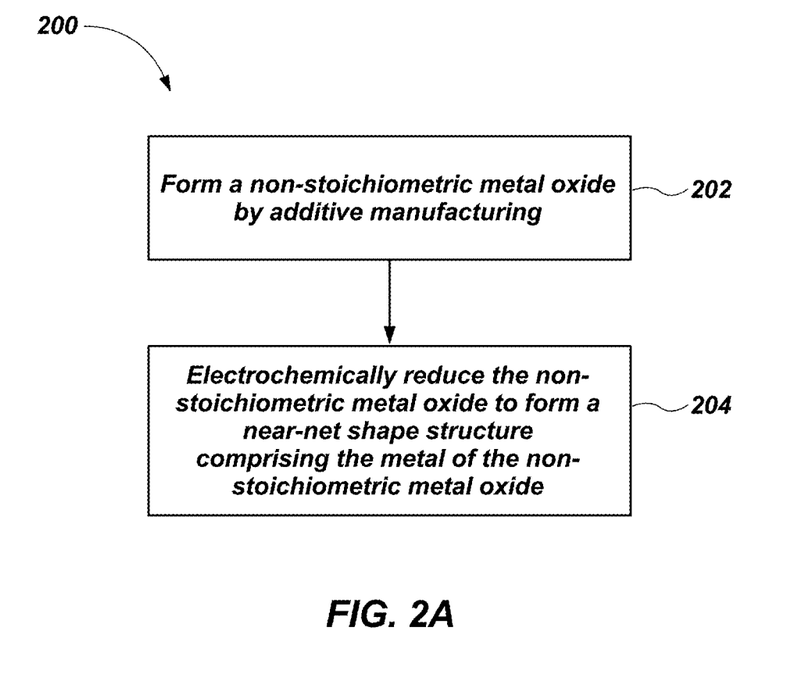
FIG. 2A is a simplified block diagram illustrating a method of forming a near-net shape structure, in accordance with embodiments of the disclosure.

FIG. 2A is a simplified block diagram illustrating a method 200 of forming a near-net shape structure, in accordance with embodiments of the disclosure. The method 200 includes act 202 including forming a non-stoichiometric metal oxide by additive manufacturing; and act 204 including electrochemically reducing the non-stoichiometric metal oxide to form a near-net shape structure comprising the metal of the non-stoichiometric metal oxide.

Act 202 may include forming a non-stoichiometric metal oxide by additive manufacturing. The non-stoichiometric metal oxide may be formed by any suitable additive manufacturing method including, for example, laser printing (also referred to as 3D laser printing), laser engineered net shaping (LENS), selective laser sintering (SLS), metal laser sintering (MLS), selective laser melting (SLM) (also referred to as direct metal laser melting (DMLM) or laser powder bed fusion (LPBF)), aerosol jet printing (AJP) (also referred to as aerosol ink additive manufacturing), plasma jet printing, powder bed additive manufacturing, wire arc additive manufacturing (WAAM), direct energy deposition, stereolithography (SLA), digital light projection (DLP) (also referred to as digital light processing), solgel additive manufacturing. Although specific methods of additive manufacturing have been described with reference to act 202, the disclosure is not so limited and act 202 may include methods of additive manufacturing other than those described above.

Figure 2B:
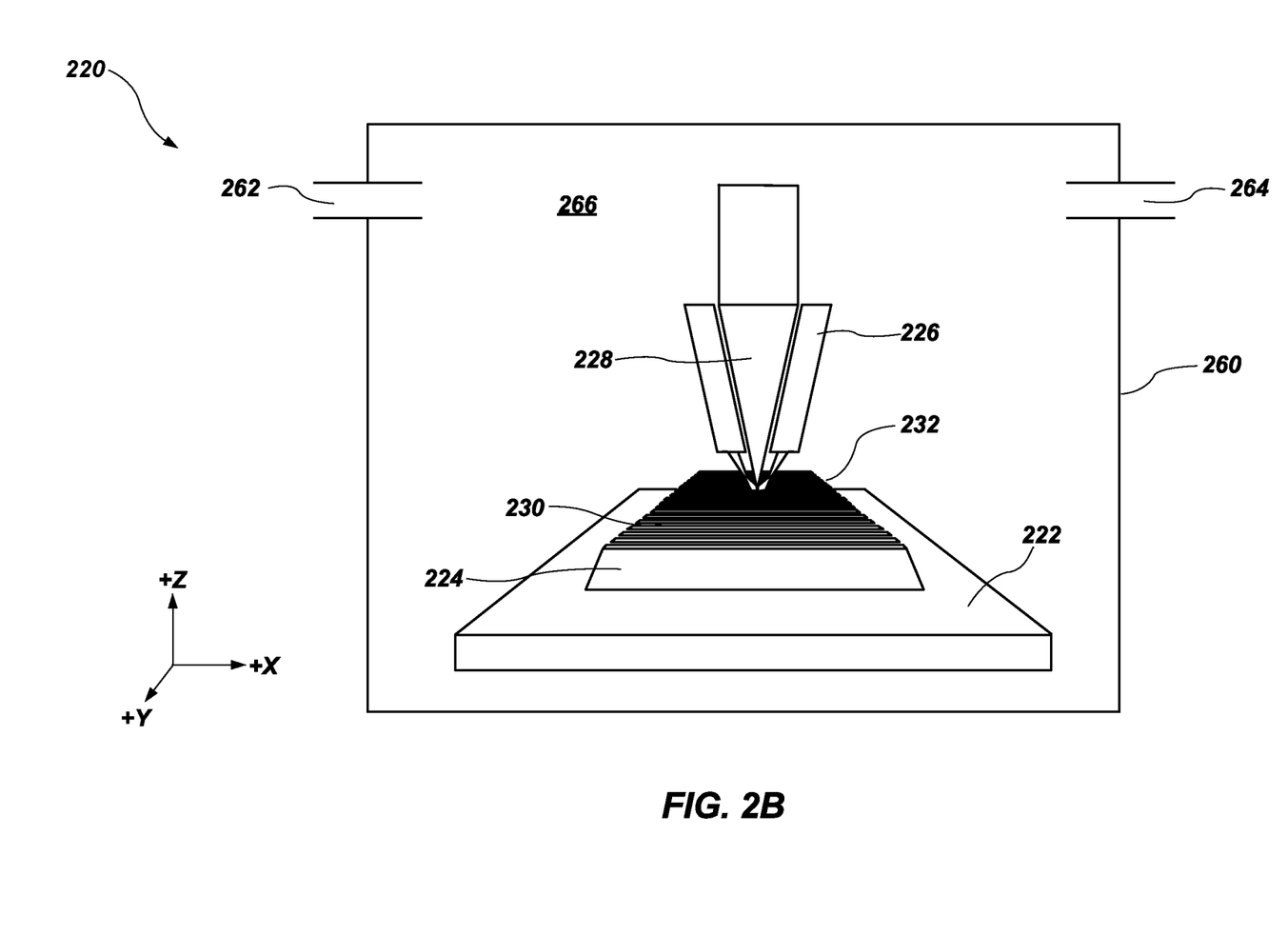
FIG. 2B is a simplified schematic of a system for additively manufacturing a structure, in accordance with embodiments of the disclosure.

FIG. 2B is a simplified schematic of a system 220 for additively manufacturing a structure 230 (e.g., the non-stoichiometric metal oxide structure having a first size and shape), in accordance with embodiments of the disclosure. The system 220 may comprise, for example, a laser engineering net shaping system, a selective laser sintering system, or another system for additively manufacturing the structure 230. The system 220 comprises a table 222 configured to receive a substrate 224. The table 222 may be configured to move in the x-direction and the y-direction. In some embodiments, the table 222 is configured to move in the z-direction. The substrate 224 may comprise any suitable material on which the structure 230 may be formed by additive manufacturing.

The structure 230 may be formed over the substrate 224 by disposing a powder material on the substrate 224, and exposing the powder material to energy from an energy source 228. The energy source 228 may comprise, for example, a laser. The powder material may be provided to a surface 232 of the substrate 224 (or an upper exposed surface of the structure 230) via one or more powder delivery nozzles 226. In some embodiments, the system 220 includes more than one powder delivery nozzle 226, wherein at least one of the powder delivery nozzles 226 is configured to provide a powder having a different composition than the powder provided by at least another powder delivery nozzle 226. In some embodiments, powder from different powder delivery nozzles 226 may converge on the substrate 224 or the structure 230.

The powder material may comprise one or more of the materials described above with reference to the powder mixture described above with reference to FIG. 1A. Accordingly, the powder material may include one or more metal oxides and, optionally, one or more dopants.

Figure 2C:
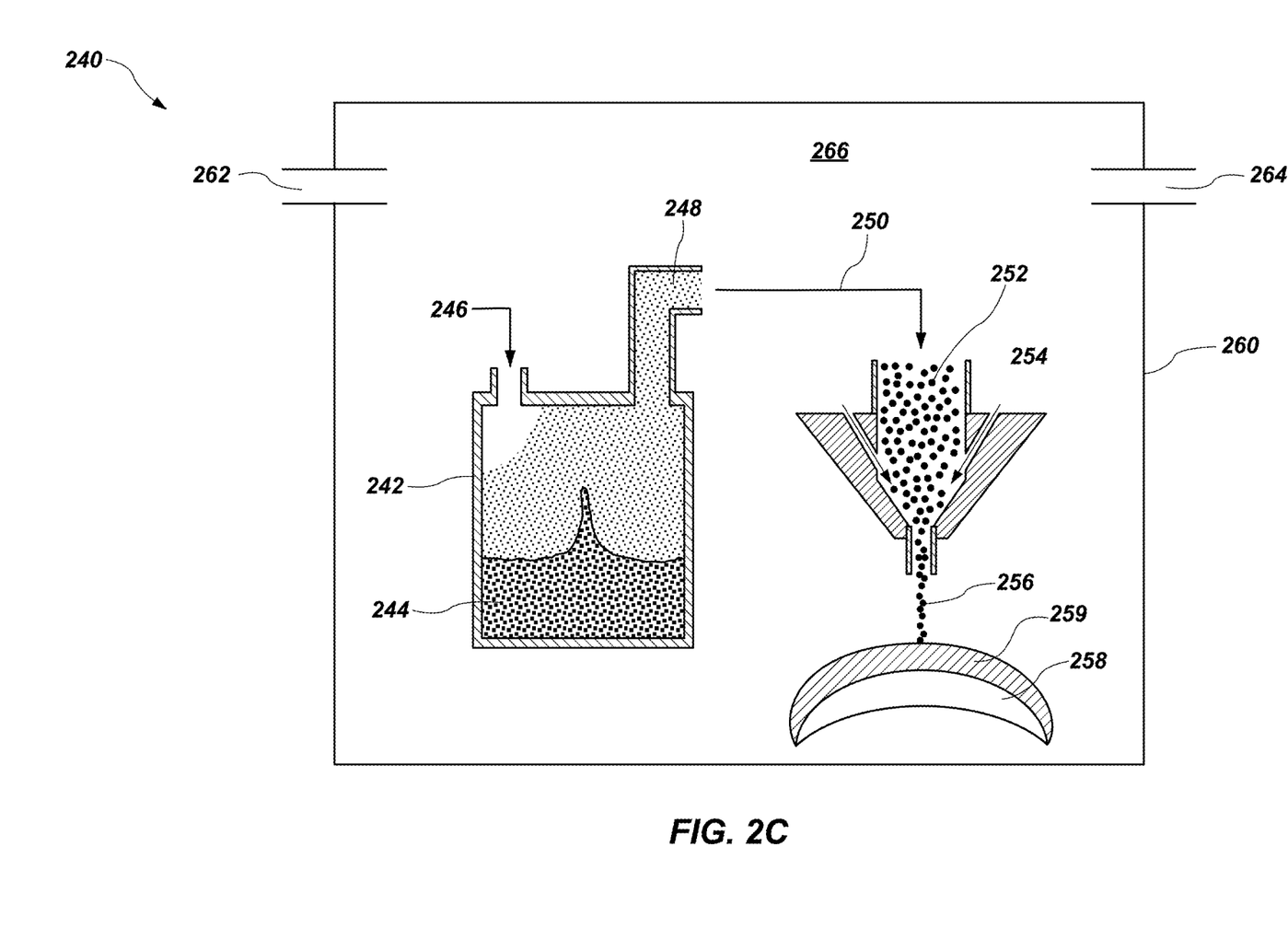
FIG. 2C is a simplified schematic of another system for additively manufacturing a structure, in accordance with other embodiments of the disclosure.

FIG. 2C is a simplified schematic of another system 240 for additively manufacturing a structure 259, in accordance with embodiments of the disclosure. The system 240 comprises a tank 242 including a feed material 244 therein. The tank 242 may include an inlet 246 through which a gas is introduced to atomize the feed material 244 and form an aerosol 250. The aerosol 250 may be provided to a delivery nozzle 252 (e.g., a deposition head) via an outlet 248 of the tank 242. A sheath gas (e.g., carrier gas) may be mixed with the aerosol 250 as the aerosol 250 exits the delivery nozzle 252. The sheath gas may be provided via a sheath gas outlet 254, which may comprise a shroud around the outlet of the delivery nozzle 252. A beam 256 of the aerosol 250 may be provided to a surface of a substrate 258 or an upper surface of an article to form a thickness (e.g., a layer) of the structure 259.

After depositing the aerosol on the substrate 258 and forming a thickness of the structure 259, the delivery nozzle 252 may be moved relative to the substrate 258. The aerosol 250 may be delivered to the upper exposed surface of the structure 259 to form another thickness of the structure 259. The process may be repeated until the structure 259 is formed to have a desired size and shape.

The feed material 244 may include one or more of the materials described above with reference to the powder mixture described above with reference to FIG. 1A. Accordingly, the feed material 244 may include one or more metal oxides and, optionally, one or more dopants.

The systems 220, 240 may be controlled by a processor having associated therewith a memory including instructions configured to direct the respective ones of the powder delivery nozzles 226 and the delivery nozzle 252 to locations where powder or the aerosol 250 from the respective powder delivery nozzle 226 or delivery nozzle 252 should be provided. By way of nonlimiting example, the memory may include data for formation of a desired structure in the form of a computer-aided-design (CAD) model or a computer-aided-manufacturing (CAM) model configured to direct the powder delivery nozzles 226 and the delivery nozzle 252.

Although FIG. 2B and FIG. 2C illustrate particular systems 220, 240 for additively manufacturing a structure 230, 259, the disclosure is not limited to such systems 220, 240. In other embodiments, one or more structures 230, 259 may be additively manufactured with other systems, such as with a selective laser sintering (SLS) system, a powder bed additive manufacturing system, a wire arc additive manufacturing system, a plasma jet printing system, direct energy deposition, stereolithography, digital light projection, solgel additive manufacturing, another additive manufacturing method, or combinations thereof.

Forming the structures 230, 259 may include, for example, forming at least a first thickness of a structure (structure 230, 259) on a surface of a substrate (e.g., substrate 224, 258) and forming additional layers of the structure 230, 259 on the surface of the structure 230, 259 until a structure having a desired size and shape is formed. Forming the first thickness of the structure may include forming a first thickness of a feed material (e.g., powder mixture, feed material 244) on a surface of the substrate and exposing (e.g., selectively exposing) at least a portion of the first thickness of the feed material to energy (e.g., electromagnetic radiation from a laser, energy from an electron beam, a plasma beam) to form bonds (e.g., metallurgical bonds, such as by sintering) between adjacent particles of the feed material within the first thickness. In some embodiments, a portion of the first thickness of the feed material is not exposed to energy such that the unexposed portion of the feed material does not form bonds with adjacent particles of the feed material. In some such embodiments, only a portion of the first thickness of the feed material is selectively exposed to energy. As used herein, selectively exposing a material to energy means and includes exposing only a portion of the material (e.g., a particular pattern of the material) to the energy. The energy may include, for example, focused energy, such as a laser, an electron beam, heat through a nozzle, a plasma, or another form of focused energy (e.g., a beam). The structure may be formed layer by layer to form a final structure having the desired size and shape. Accordingly, after forming the first layer of the structure, additional layers of the structure may be formed over previously formed layers of the structure until a structure having a desired size and shape is formed.

With combined reference to FIG. 2A through FIG. 2C, forming the non-stoichiometric metal oxide by additive manufacturing may include forming the structures (e.g., structure 230, the structure 259) in a reducing atmosphere. For example, the systems 220, 240 may comprise an enclosure 260 disposed around at least the energy source 228 (FIG. 2B), the table 222 (FIG. 2B), the substrate 224 (FIG. 2B), the structure 230 (FIG. 2B), the aerosol 250 (FIG. 2C), the delivery nozzle 252 (FIG. 2C), the beam 256 (FIG. 2C), and the substrate 258 (FIG. 2C). The enclosure 260 may include an inlet 262 and an outlet 264 configured to facilitate introduction of a reducing gas (e.g., one or more of the reducing gases described above, such as one or more of hydrogen, a mixture of hydrogen and helium, or a mixture of hydrogen and argon) into a volume 266 within the enclosure 260. In use and operation, the reducing gas may be flowed through the enclosure 260 during additive manufacturing of the non-stoichiometric metal oxide (e.g., the structures 230, 259).

Forming the structures 230, 259 in the reducing atmosphere may form the structures 230, 259 to comprise a non-stoichiometric metal oxide. The non-stoichiometric metal oxide may be substantially the same as the non-stoichiometric metal oxide described above with reference to FIG. 1A. Accordingly, the non-stoichiometric metal oxide may be from about 1 percent to about 20 percent oxygen deficient, such as from about 1 percent to about 3 percent, from about 3 percent to about 5 percent, from about 5 percent to about 10 percent, from about 10 percent to about 15 percent, or from about 15 percent to about 20 percent oxygen deficient. Stated another way, the non-stoichiometric metal oxide may have from about 1 percent to about 20 percent less oxygen atoms than a stoichiometric metal oxide.

Referring back to FIG. 2A, the method 200 further comprises act 204 including electrochemically reducing the non-stoichiometric metal oxide to form a near-net shape structure comprising the metal. Act 204 may be substantially similar to act 106 described above with reference to FIG. 1A.

The resulting final structure exhibits improved properties (e.g., lower ppm oxygen) compared to metals formed by slip casting and electrochemical reduction. In addition, the final structure may exhibit many desired shapes, whereas structures formed by slip casting may be limited to particular shapes (e.g., hollow structures or powders). The final structure may have a density substantially similar to the density of the metal(s) of the final structure and may exhibit a density greater than a density of structures formed by electrochemically reducing stoichiometric metal oxides.

Accordingly, a structure comprising a substantially non-oxidized metal or metal alloy may be formed by electrochemically reducing a non-stoichiometric metal oxide in an electrochemical cell. The non-stoichiometric metal oxide may be formed by additive manufacturing in the presence of a reducing gas. The reducing gas may facilitate formation of the non-stoichiometric metal oxide.

EXAMPLES

Example 1

Figure 3A:
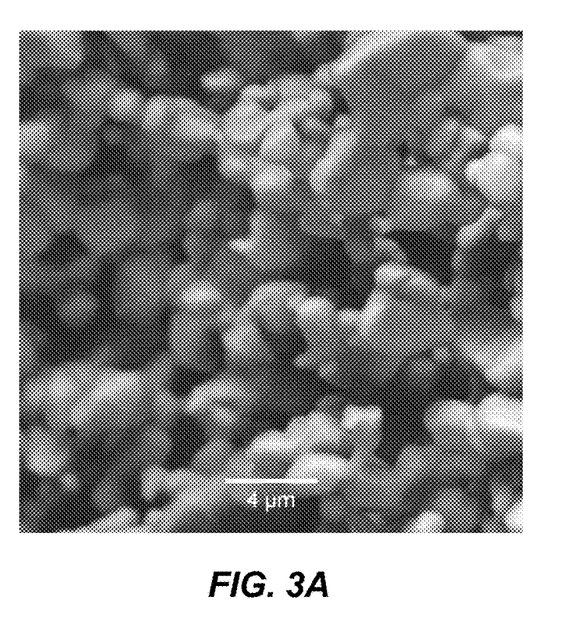
FIG. 3A is a simplified scanning electron microscope (SEM) image of a non-stoichiometric titanium dioxide pellet.

High purity titanium dioxide was mixed with binders, pelletized, and sintered in a reducing atmosphere to form sintered pellets comprising a non-stoichiometric titanium oxide (e.g., $TiO_{(2-x)}$, wherein x is within a range from about 0.01 to about 0.40, for example). FIG. 3A is a simplified scanning electron microscope (SEM) image of the non-stoichiometric titanium oxide. As can be seen in FIG. 3A, the non-stoichiometric titanium oxide included an increased porosity and a corresponding increase in the number of mobile paths. The increased number of mobile paths are due to the non-stoichiometry in the non-stoichiometric metal oxide.

The sintered pellets formed as described above included an aperture, through which a nickel wire was fed to thread the sintered pellets onto the nickel wire. The nickel wire, including the attached sintered pellets, was lowered into an electrochemical cell including an electrolyte comprising a molten salt of anhydrous calcium chloride and about 1 percent calcium oxide (CaO) disposed in an alumina crucible. The electrochemical cell included an anode comprising high density graphite disposed in the molten salt. The cathode of the electrochemical cell comprised the sintered non-stoichiometric titanium oxide pellets and the nickel wire. The alumina crucible was placed in a reactor comprising Inconel 600®. The reactor included an inlet and an outlet to facilitate the flow of moisture-free argon gas.

A voltage from about 2.5 V to about 3.1 V was applied between the cathode and the anode and the temperature of the molten salt electrolyte was maintained at about 950° C. to reduce the sintered pellets comprising the non-stoichiometric titanium oxide. Argon was flowed through the reactor during the electrochemical reduction of the titanium oxide pellets. After about 20 hours, the reduced pellets were removed from the electrochemical cell and washed in water and acetone to remove the molten salt from the reduced pellets, followed by drying in an oven at less than about 100° C. for about 12 hours.

Figure 3B:
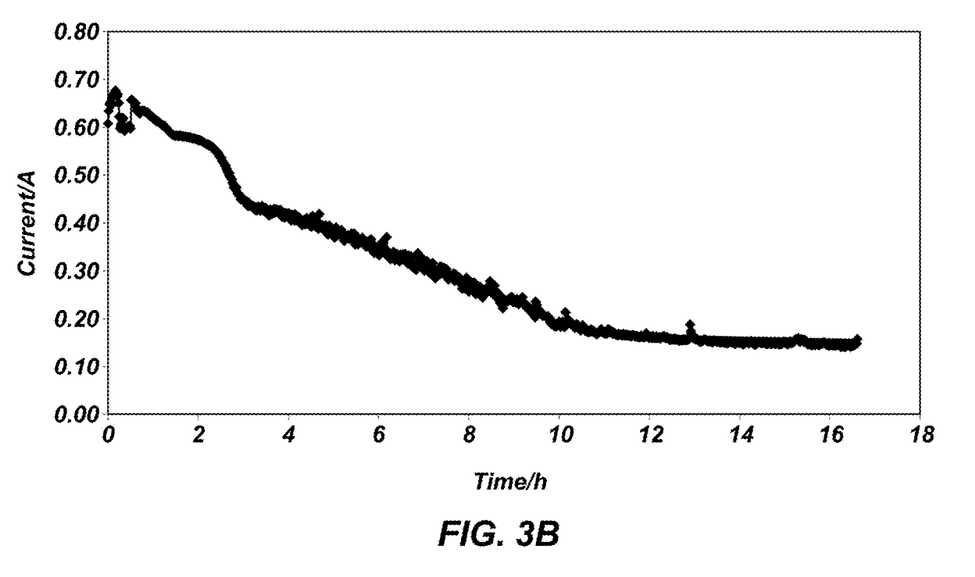
FIG. 3B is a graph illustrating the current profile of an electrochemical cell during the electrochemical reduction of the non-stoichiometric titanium dioxide pellet of FIG. 3A.

FIG. 3B is a graph illustrating the current profile of the electrochemical cell during the first about 17 hours of the electrochemical reduction of the sintered pellets comprising the non-stoichiometric titanium oxide. As can be seen from the graph, the initial current was about 0.68 A and the final current was about 0.18 A. The gradual decline in the current is an indication of the corresponding gradual oxygen removal from the non-stoichiometric titanium oxide to form a near-net shape structure comprising the reduced pellets.

Figure 3C:
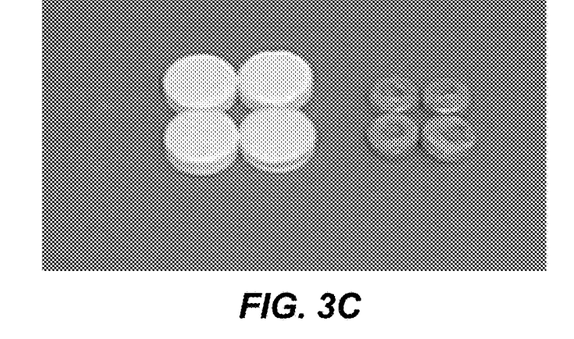
FIG. 3C is an image illustrating the non-stoichiometric titanium oxide pellets of FIG. 3A and the pellets after reduction in the electrochemical cell.

FIG. 3C is an image illustrating the non-stoichiometric titanium oxide pellets (on the left) and the reduced pellets (on the right). The reduced pellets comprised substantially pure metallic titanium, as determined by conventional techniques, and included from about 1,300 ppm oxygen to about 2,200 ppm oxygen. The reduced pellets had a diameter that was about 26 percent less than the diameter of the sintered pellets comprising the non-stoichiometric titanium oxide and a thickness that was about 30 percent less than the thickness of the sintered pellets comprising the non-stoichiometric titanium oxide. The reduction in diameter and thickness is believed to be caused by the gradual removal of oxygen and in-situ annealing of the sintered pellets during the electrochemical reduction process.

With reference to FIG. 3C, titanium metal pellets exhibited substantially the same shape, but a smaller size, than the non-stoichiometric titanium oxide sintered pellets. In addition, the titanium metal exhibited a substantially uniform composition and did not exhibit any non-metallic regions. The density of the titanium metal pellets was about the same as the density of pure titanium, indicating that the titanium metal pellets exhibited negligible porosity.

Example 2

Figure 4A:
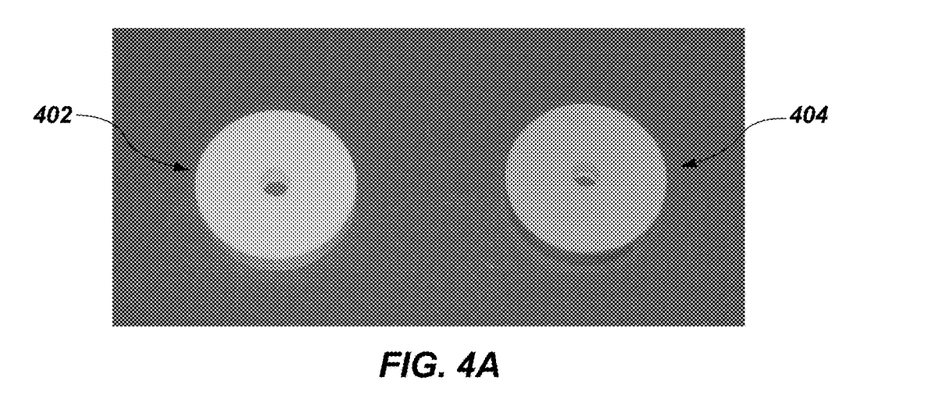
FIG. 4A is an image of a first pellet comprising tantalum oxide and a second pellet comprising non-stoichiometric tantalum oxide.

Two sintered oxide pellets comprising tantalum oxide were prepared by sintering. The first pellet was sintered in air and the second pellet was sintered in a reducing atmosphere (in the presence of pure hydrogen). FIG. 4A is an image of the first pellet 402 and the second pellet 404. The color of the first pellet 402 was white, indicating the presence of stable $Ta_2O_5$, while the color of the second pellet 404 was light-grey, indicating the formation of a non-stoichiometric tantalum oxide ($Ta_2O_{(5-x)}$; $Ta_xO_y$). As described with reference to Example 1, the first pellet 402 and the second pellet 404 were threaded onto a nickel wire and introduced into an electrochemical cell comprising a molten salt electrolyte comprising anhydrous calcium chloride (containing about 1 weight percent ultra-dry CaO). The electrochemical cell included a counter electrode (anode) comprising an oxygen-evolving electrode and a reference electrode comprising glassy carbon.

Electrochemical reduction of the first pellet 402 and the second pellet 404 was performed in a stainless steel glove box with an argon-controlled atmosphere. The glove box was continuously purged with argon gas during the electrochemical reduction of the first pellet 402 and the second pellet 404. A potential within a range from about 2.6 V to about 2.9 V was applied between the cathode (the nickel wire threaded through the first pellet 402 and the second pellet 404) and the counter electrode. The temperature of the molten salt was maintained at about 900° C. during the electrochemical reduction.

Figure 4B:
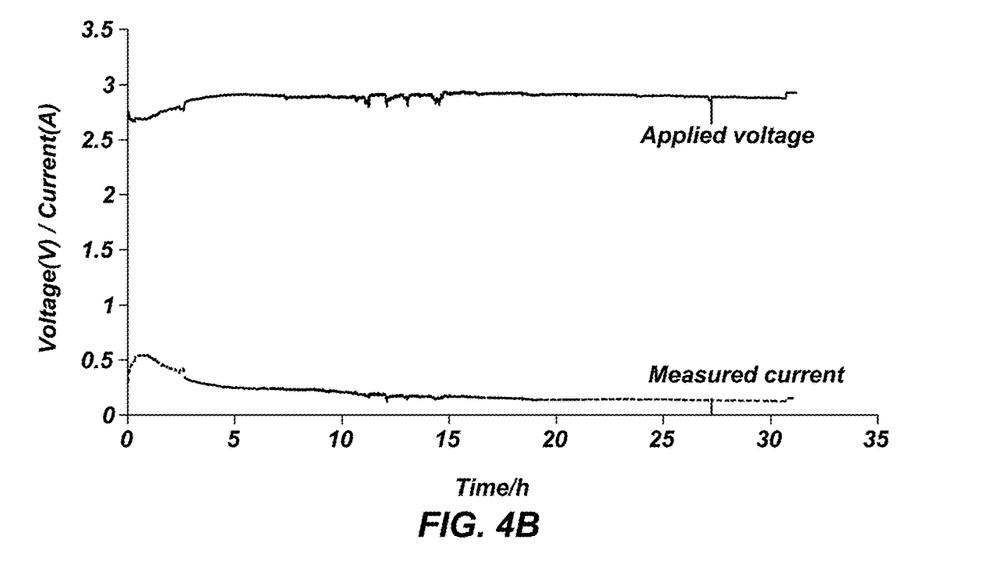
FIG. 4B is a graph illustrating the current and voltage of an electrochemical cell as a function of time during the electrochemical reduction of the first pellet and the second pellet of FIG. 4A.

FIG. 4B is a graph illustrating the current and voltage of the electrochemical cell as a function of time of the pellet 404. The measured current indicated an initial rise, followed by a gradual decline as the reduction reaction progressed. The initial current was about 0.29 A, the peak current was about 0.54 A, and the final (residual) current was about 0.14 A.

The reduced pellet formed from the non-stoichiometric tantalum oxide included substantially pure tantalum, as determined by conventional techniques. The reduced pellets exhibited a smaller diameter and thickness than the sintered oxide pellets prior to electrochemical reduction.

Example 3

Pellets each comprising a mixed oxide of neodymium (III) oxide ($Nd_2O_3$) and iron (III) oxide ($Fe_2O_3$) were prepared by mixing the neodymium (III) oxide and iron (III) oxide powders with polyethylene glycol (PEG) and polyvinyl alcohol (PVA), which in turn, was mixed with isopropyl alcohol to form a homogeneous mixture. The homogenized mixture was compacted into 13 mm pellets in a stainless steel die to form green pellets of the mixed neodymium oxide and iron oxide. The green pellets were heated in a gas comprising about 3 volume percent hydrogen and about 97 volume percent argon to form sintered pellets comprising a non-stoichiometric oxide.

The sintered pellets were threaded onto a nickel wire, as described above with reference to Example 1. The electrochemical cell included a counter electrode comprising graphite, a reference electrode comprising glassy carbon, and a working electrode comprising the nickel wire coupled to the non-stoichiometric oxide pellets.

The sintered pellets were electrochemically reduced in an electrochemical cell including a molten salt comprising calcium chloride maintained at a temperature of from about 850° C. to about 900° C. to form an alloy comprising neodymium and iron. The electrochemical cell was located in a stainless steel glove box and argon gas was continuously flowed through the glove box during the electrochemical reduction of the sintered pellets.

Figure 5:
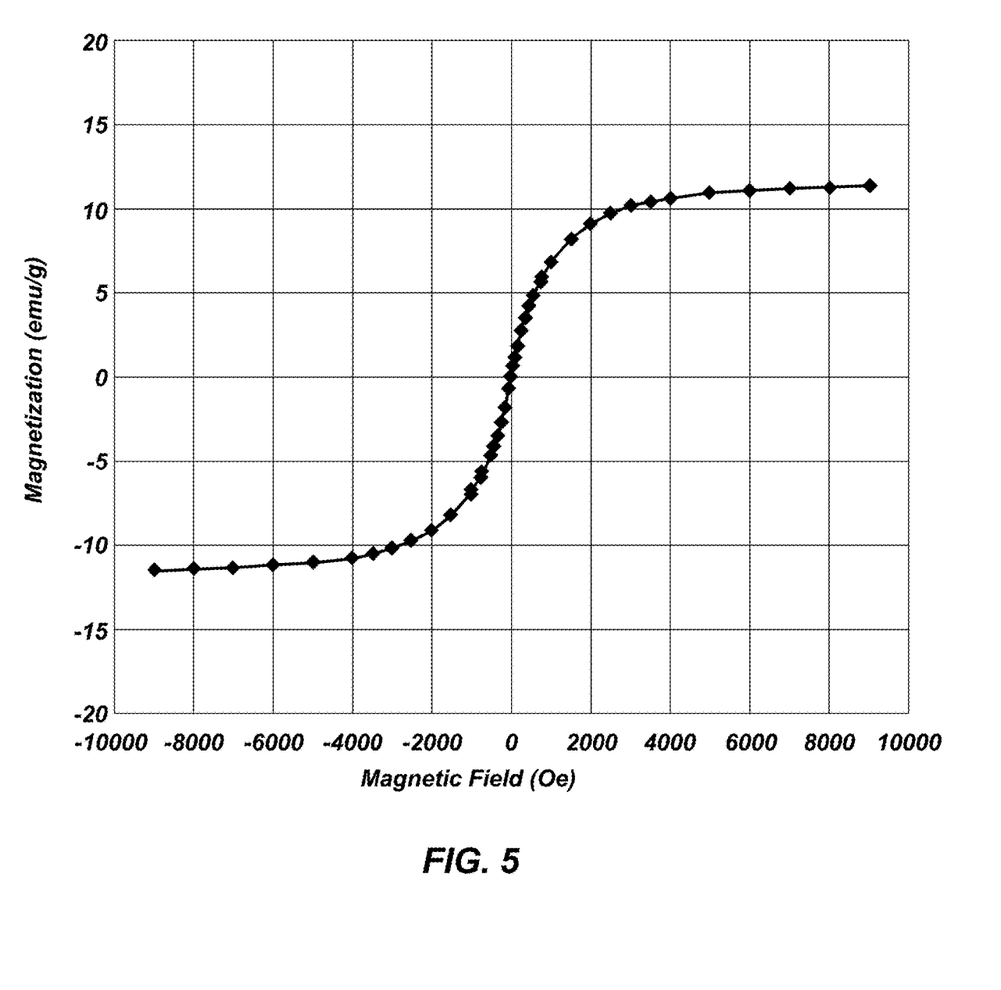
FIG. 5 is a graph illustrating the magnetic properties of reduced sintered pellets comprising a substantially pure alloy of neodymium and iron.

FIG. 5 is a graph illustrating the magnetic properties of the alloy. The non-stoichiometric oxide did not exhibit magnetic properties. However, the resulting alloy exhibited soft magnetism (magnetic properties upon exposure to a magnetic field).

Another electrochemical cell was prepared and included a counter electrode comprising ruthenium (rather than graphite), a reference electrode comprising glassy carbon, and a working electrode comprising the nickel wire coupled to similar non-stoichiometric oxide pellets. The sintered pellets were electrochemically reduced in a molten salt comprising calcium chloride maintained at a temperature of from about 850° C. to about 900° C. to form an alloy comprising neodymium and iron. The ruthenium counter electrode exhibited no thinning or mechanical degradation.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of forming a near-net shape structure, the method comprising:
   sintering a green structure exhibiting a green structure shape and comprising a stoichiometric metal oxide in a reducing atmosphere to form a structure comprising a non-stoichiometric metal oxide comprising at least one metal and less than a stoichiometric amount of oxygen; and
   after sintering the green structure to form the structure comprising the non-stoichiometric metal oxide, electrochemically reducing the non-stoichiometric metal oxide in an electrochemical cell to form a near-net shape structure comprising the at least one metal and having less than about 1,500 ppm oxygen, wherein the near-net shape structure has a shape substantially corresponding to the green structure shape.

2. The method of claim 1, wherein sintering a green structure comprising a stoichiometric metal oxide comprises exposing the stoichiometric metal oxide to an elevated temperature in the presence of a reducing gas.

3. The method of claim 2, wherein exposing the stoichiometric: metal oxide to an elevated temperature in the presence of a reducing gas comprises exposing the stoichiometric metal oxide to the elevated temperature in the presence of hydrogen.

4. The method of claim 1, wherein sintering a green structure comprising a stoichiometric metal oxide in a reducing atmosphere to form a structure comprising a non-stoichiometric metal oxide comprising at least one metal and less than a stoichiometric amount of oxygen comprises forming a non-stoichiometric metal oxide comprising at least one transition metal oxide.

5. The method of claim 1, wherein sintering a green structure comprising a stoichiometric metal oxide in a reducing atmosphere to form a structure comprising a non-stoichiometric metal oxide comprising at least one metal and less than a stoichiometric amount of oxygen comprises forming a non-stoichiometric metal oxide comprising at least one rare earth element.

6. The method of claim 1, wherein sintering a green structure comprising a stoichiometric metal oxide in a reducing atmosphere to form a structure comprising a non-stoichiometric metal oxide comprising at least one metal and less than a stoichiometric amount of oxygen comprises forming a non-stoichiometric metal oxide comprising at least one dopant selected from the group consisting of boron, carbon, phosphorus, silicon, and aluminum.

7. The method of claim 1, wherein electrochemically reducing the non-stoichiometric metal oxide in an electrochemical cell comprises electrochemically reducing the non-stoichiometric metal oxide in the electrochemical cell using a molten salt electrolyte comprising one or more of calcium chloride, sodium chloride, calcium bromide, and sodium bromide.

8. The method of claim 1, wherein electrochemically reducing the non-stoichiometric metal oxide in an electrochemical cell to form a near-net shape structure comprising the at least one metal and having less than about 1,500 ppm oxygen comprises forming a near-net shape structure exhibiting magnetic properties.

9. The method of claim 1, wherein forming a near-net shape structure comprising the at least one metal comprises forming a near-net shape structure comprising one or more of an alloy comprising dysprosium and iron, an alloy comprising terbium and iron, an alloy comprising dysprosium and nickel, and an alloy comprising neodymium and iron.

10. The method of claim 1, wherein sintering a green structure comprising a stoichiometric metal oxide in a reducing atmosphere to form a structure comprising a non-stoichiometric metal oxide comprising at least one metal and less than a stoichiometric amount of oxygen comprises forming a non-stoichiometric metal oxide that is from about 1 percent to about 20 percent oxygen deficient relative to the stoichiometric metal oxide.

11. A method of forming a near-net shape structure, the method comprising:
forming a green structure comprising at least one stoichiometric metal oxide;
sintering the green structure in the presence of at least one reducing gas to reduce the at least one stoichiometric metal oxide of the green structure and to form a non-stoichiometric metal oxide; and
reducing the non-stoichiometric metal oxide in an electrochemical cell including a cathode comprising the non-stoichiometric metal oxide to form a structure having a near-net shape and comprising an elemental metal or a metal alloy.

12. The method of claim 11, wherein sintering the green structure in the presence of at least one reducing gas comprises sintering the green structure in the presence of hydrogen.

13. The method of claim 11, wherein forming a structure having a near-net shape and comprising an elemental metal or a metal alloy comprises forming a structure comprising the at least one metal and less than about 2,000 ppm oxygen.

14. The method of claim 11, wherein forming a structure having a near-net shape and comprising an elemental metal or a metal alloy comprises forming a structure comprising at least two transition metals.

15. The method of claim 11, wherein reducing the non-stoichiometric metal oxide in an electrochemical cell to form a structure having a near-net shape comprises forming a structure that is smaller than the green structure.

16. A method of forming a near-net shape structure, the method comprising:
forming a structure comprising an oxygen deficient non-stoichiometric metal oxide in a reducing environment, the non-stoichiometric metal oxide comprising less than a stoichiometric amount of oxygen and at least one metal, wherein the structure comprising the oxygen deficient non-stoichiometric metal oxide consists essentially of the non-stoichiometric metal oxide; and
after forming the non-stoichiometric metal oxide, electrochemically reducing the non-stoichiometric metal oxide in an electrochemical cell to form the near-net shape structure.

17. The method of claim 16, wherein forming a structure comprising an oxygen deficient non-stoichiometric metal oxide in a reducing environment comprises forming the structure comprising the oxygen deficient non-stoichiometric metal oxide by additive manufacturing in the presence of a reducing gas.

18. The method of claim 16, wherein forming a structure comprising an oxygen deficient non-stoichiometric metal oxide in a reducing environment comprises annealing or sintering a metal oxide in the reducing environment.

19. The method of claim 16, further comprising, prior to forming a structure comprising an oxygen deficient non-stoichiometric metal oxide in a reducing environment, forming a metal oxide on a substrate by thermal spraying.

20. The method of claim 16, wherein electrochemically reducing the non-stoichiometric metal oxide in an electrochemical cell to form a near-net shape structure comprises forming the near-net shape structure to have a size that is less than a size of the oxygen deficient non-stoichiometric metal oxide.

21. The method of claim 1, wherein sintering a green structure exhibiting a green structure shape and comprising a stoichiometric metal oxide in a reducing atmosphere to form a structure comprises forming the green structure consisting essentially of the stoichiometric metal oxide.

22. The method of claim 16, wherein electrochemically reducing the non-stoichiometric metal oxide in an electrochemical cell to form the near-net shape structure comprises applying a voltage of from about 2.5 V to about 2.9 V between a working electrode and a counter electrode of the electrochemical cell.

23. The method of claim 16, wherein electrochemically reducing the non-stoichiometric metal oxide in an electrochemical cell to form the near-net shape structure comprises applying a voltage of from about 1.8 V to about 2.9 V between a working electrode and a counter electrode of the electrochemical cell.

* * * * *

UNITED STATES PATENT AND TRADEMARK OFFICE
CERTIFICATE OF CORRECTION

PATENT NO. : 11,919,078 B2
APPLICATION NO. : 16/841863
DATED : March 5, 2024
INVENTOR(S) : Prabhat K. Tripathy and Michael R. Shaltry It is certified that error appears in the above-identified patent and that said Letters Patent is hereby corrected as shown below:

In the Specification

| | | |
|---|---|---|
| Column 2, | Line 30, | change "deficient one metal" to --deficient metal-- |
| Column 9, | Lines 21-22, | change "chloride (CaCl$_2$)), a molten" to --chloride (CaCl$_2$), a molten-- |
| Column 12, | Line 38, | change "FIG. 1C have a are" to --FIG. 1C are-- |
| Column 12, | Line 55, | change "about 1,5500° C.," to --about 1,500° C.,-- |
| Column 12, | Line 57, | change "about 1,100"C," to --about 1,100° C.,-- |

In the Claims

| | | | |
|---|---|---|---|
| Claim 3, | Column 18, | Lines 56-57, | change "the stoichiometric: metal oxide" to --the stoichiometric metal oxide-- |
| Claim 5, | Column 19, | Lines 3-4, | change "a non-stoichiometric: metal oxide" to --a non-stoichiometric metal oxide-- |

Signed and Sealed this
Thirtieth Day of April, 2024

Katherine Kelly Vidal
*Director of the United States Patent and Trademark Office*